United States Patent [19]

Hansen

[11] Patent Number: 5,819,117
[45] Date of Patent: Oct. 6, 1998

[54] METHOD AND SYSTEM FOR FACILITATING BYTE ORDERING INTERFACING OF A COMPUTER SYSTEM

[75] Inventor: Craig C. Hansen, Los Altos, Calif.

[73] Assignee: Microunity Systems Engineering, Inc., Sunnyvale, Calif.

[21] Appl. No.: 541,419

[22] Filed: Oct. 10, 1995

[51] Int. Cl.[6] ...................................... G06F 7/00
[52] U.S. Cl. ........................... 395/898; 395/561
[58] Field of Search ..................... 395/800, 898, 395/411, 561, 566, 390, 380, 500

[56] References Cited

U.S. PATENT DOCUMENTS

| | | | |
|---|---|---|---|
| 4,814,976 | 3/1989 | Hansen et al. | 711/201 |
| 4,959,779 | 9/1990 | Weber et al. | 395/411 |
| 5,107,415 | 4/1992 | Sato et al. | 395/800 |
| 5,398,328 | 3/1995 | Weber et al. | 395/500 |
| 5,410,677 | 4/1995 | Roskowski et al. | 395/500 |
| 5,524,256 | 6/1996 | Turkowski | 395/800 |
| 5,594,919 | 1/1997 | Turkowski | 395/800 |

FOREIGN PATENT DOCUMENTS

| | | |
|---|---|---|
| 2 229 832 | 10/1990 | United Kingdom . |
| WO 94/15269 | 7/1994 | WIPO . |

OTHER PUBLICATIONS

James, David V., Multiplexed Buses: The Endian Wars Continue, Jun. 1990, pp. 9–21.
Power PC 601, RISC Microprocessor User's Manual, copyright 1993, pp. 1–4, 1–6, 2–47 thur. 2–53, 2–57, 3–42 thur. 3–49.
Tanebaum, Andrew S., 2.2.3 Byte Ordering, copyright 1990, pp. 43–44.

*Primary Examiner*—Parshotam S. Lall
*Assistant Examiner*—Patrice L. Winder
*Attorney, Agent, or Firm*—Burns, Doane, Swecker & Mathis, L.L.P.

[57] ABSTRACT

A method and data processing system for transferring data between the system and a memory system using more than one byte ordering convention by incorporating byte order information into instruction codes. The byte order information is coupled to a control unit along with other information characterizing the data transfer operation. In response to the byte order information and the data transfer operation information, the control unit generates a control signal that is coupled to a BPU. The control signal causes the BPU to rearrange the order of bytes in the data being transferred when the byte order information indicates a first byte ordering format. When the byte order information indicates a second byte ordering format, the BPU does not change the order of the bytes in the data being transferred.

24 Claims, 8 Drawing Sheets

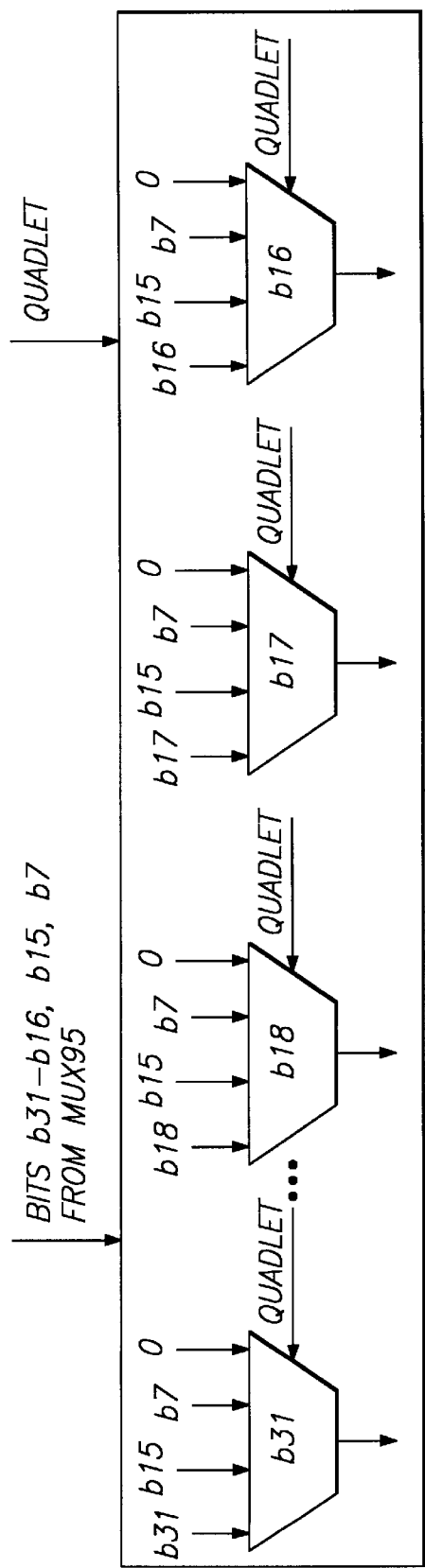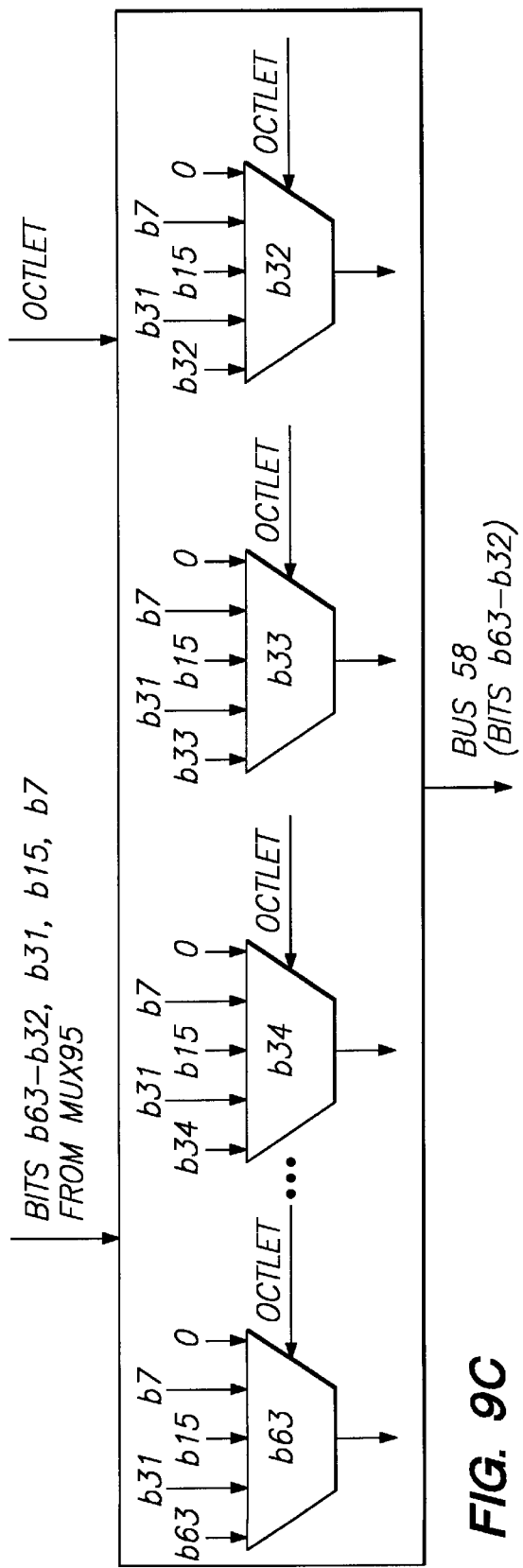
FIG. 9B
FIG. 9C

METHOD AND SYSTEM FOR FACILITATING BYTE ORDERING INTERFACING OF A COMPUTER SYSTEM

FIELD OF THE INVENTION

The present invention relates to the field of computer systems, and more particularly to computer system byte ordering formats.

BACKGROUND OF THE INVENTION

In a computer system, information is transferred between devices within the system in the form of bits or bytes (i.e. eight bits) of binary data. In general, the data is transferred on buses that are capable of transmitting some multiple of eight bits, where the width of the bus indicates the number of bits it is capable of transmitting. Further, the amount of data that is transferred on a given bus may be the same width as the bus or less. For instance, a bus having a width of 64 bits (i.e. 8 bytes) may be used to transfer only one byte of data (i.e. 8 bits).

Data transfers between a computer system's central processing unit (CPU) and a memory system that stores digital data is one of the main data transfer operations performed in a computer system. The two types of data transfer operations that are performed between a CPU's registers and a memory system's memory locations are load and store operations. A load operation is the transfer of data from a designated memory location within a memory to a register within the CPU and a store operation is the transfer of data from the CPU's register to a designated memory location within a given memory.

In order to perform either a load or store operation the CPU provides an instruction that includes many different pieces of information. For instance, the instruction provides information that is used to determine which memory location (i.e. the address) that the load or store operation will involve. Specifically, the address information indicates the location within the memory in which the processor wants to store the data and the register in the CPU that the data is to be stored from (in the case of a store operation). Alternatively, the address information identifies the location within the memory where data is to be retrieved by the CPU and the register in the CPU that the retrieved data is to be loaded (in the case of a load operation).

The CPU instruction also indicates the type of operation that is to be performed, i.e. a load or store operation and the size of the data being transferred. The size information is needed because although the bus coupled between the CPU and memory has a given width, data transfers smaller or larger than that width are often performed.

Typically, when an access is performed with data having a size greater than a byte, the instruction specifies an address and the size of the data being transferred. This information is used to determine the address of the lowest and highest address bytes. For instance, the lowest address byte would be equal to the address specified in the instruction and the highest address byte would be equal to the address specified in the instruction plus the data size minus 1, (i.e. highest byte address=specified address+data size−1).

Another aspect of transferring data between a CPU to a memory device (or any other device having memory) involves the order of the bytes within the data being transferred. For example, one class of CPU utilizes a byte ordering convention referred to as "Little Endian" (L.E.) and another class of CPU utilizes "Big Endian" (B.E.). The L.E. byte ordering convention numbers the bytes within the transferred data such that the lowest addressed byte is in the least significant byte position. The B.E. byte ordering convention, on the other hand, numbers the bytes such that the lowest addressed byte is in the most significant byte position. When performing a transfer operation where the data is transferred in a parallel fashion, differences in ordering convention can result in inconsistencies in the arrangement of the moved data. For instance, if eight bytes of data are stored in a memory location by a CPU using L.E. ordering and that memory is subsequently accessed by the CPU or other device using B.E. ordering, the order of the accessed data will be wrong. Specifically, the least significant byte will start as expected in L.E. convention instead of the most significant byte starting as in the B.E. convention.

In the past, the manner in which the above described situation has been avoided is that computer systems are implemented with CPUs and devices using only one specific byte ordering scheme. There are many CPUs available that perform data transfers using either L.E. or B.E. byte ordering. For example, the PDP11 and VAX series manufactured by Digital Equipment Corporation (DEC), and the 86 series of microprocessors (such as the 80386, 80286, 8086, etc.) manufactured by Intel Corporation use L.E. byte ordering. Further, the IBM 360 and 370 series of CPUs as well as the Motorola 68000 series of microprocessors (such as the 68000, 68020, 68030, etc.) follow the B.E. byte ordering style.

One type of CPU described in U.S. Pat. No. 4,959,779 follows one byte ordering convention internally but is capable of converting in-going and out-going data to adapt it to a selectable external ordering scheme. This CPU design adapts to the different byte ordering schemes by passing in-coming data through a load aligner and out-going data through a store aligner. The load and store aligners are controlled by a shift converter. The shift amount converter, in response to the two lower order bits of the address of the data being transferred (along with other data transfer information), determines the amount of shift for the data being transferred and correspondingly alters the address of the data. In the case in which the internal byte ordering is the same as the external byte ordering, the data is not shifted. In the case in which the internal and external byte order format are different, the shift amount converter determines a shift amount to accommodate the difference in the internal and external byte ordering and renumbers the address of the data accordingly.

The main drawback of the apparatus described in U.S. Pat. No. 4,959,779 is that it assumes that the ordering scheme of the CPU is set to what is indicated in the status register of the CPU. In making this assumption, all store operations are performed such that data is stored in the byte ordering as indicated by the status register. Consequently, problems occur when the status register is subsequently changed to indicate a new byte ordering scheme.

For example, if data that was previously stored in accordance to the previously indicated byte ordering scheme is accessed by the system using a newly specified byte ordering scheme, the bytes of the data will appear in the wrong address locations.

Thus, although it is possible to change the byte ordering scheme of this prior art apparatus to adapt to different byte ordering schemes, it is primarily designed to be implemented such that the status register remains set in one particular mode. As a result, this prior art system is less flexible to interface with more than one byte ordering scheme.

Furthermore, changing the byte ordering mode in the status register requires additional instructions and often times necessitates draining the execution pipeline of the processor, resulting in processor down-time each time byte ordering mode is changed.

The present invention overcomes the above described prior art problems by rearranging and shifting (when required) the order of the bytes of the data being transferred in the case in which byte order differences occur while incorporating byte ordering information into data transfer instruction. As a result, the present invention does not exhibit the same inflexibility of changing byte ordering modes as the prior art system.

SUMMARY OF THE INVENTION

The present invention is a method and system that allows the processor to perform data transfer operations between processor registers and a memory system having more than one type of byte ordering scheme.

The processor of the present invention utilizes instruction codes to perform load and store data transfer operations between the processor's registers and its associated memory system. The memory system may be within the processor or may be in an external device having internal memory storage, or may be both within the processor and external devices. The external devices may contain processors which, in turn, have associated byte ordering formats.

In one embodiment, the processor instruction code includes information defining the direction and size of the data transfer operation being performed, a byte ordering indicator that defines the byte ordering format of the data to be transferred between the memory system and the processor, and address information utilized to perform the data transfer operation.

The address information incorporated in the instruction code is coupled to an address computation unit which functions to generate the addresses needed to perform the data transfer operation. A portion of the calculated addresses, the data size, and the byte ordering indicator, are coupled to a control generation unit that generates a control signal that is used to control a byte permutation unit. The byte permutation unit functions to either pass, shift, rearrange, or rearrange and shift the bytes of the transferred data depending on the status of the byte ordering indicator, the calculated addresses, and data size of the processor instruction.

In the method of the present invention, if the byte ordering scheme of the processor of the present invention and the memory system is the same, the byte ordering indicator in the instruction code is in a first state and the data is passed through the permutation unit without rearranging the order of the bytes.

In the case in which the processor and the memory system have different byte ordering schemes, the byte ordering indicator in the instruction code is in a different state other than the first state and the byte permutation unit rearranges the bytes of the transferred data in the manner specified by the byte order indicator. After the data is processed by the permutation unit it is transferred to a given location as specified by the instruction code. In the case in which a data transfer having a size less than the width of the processor bus is performed, data is also shifted by the permutation unit as designated by the instruction code. In one embodiment of the present invention, the processor is capable of performing parallel transfers of 16 bytes of data at one time. In a variation of the above embodiment, the permutation unit is capable of performing zero fill and sign extension operations as designated by the instruction code.

In one embodiment of the present invention, a single processor instruction is used for single-byte loads and stores of either byte order. In other words, single byte load and store instructions of present invention do not specify whether L.E. or B.E. ordering is to be used because other multiple byte load and store operations are consistent with locations used by single byte load and store operations.

BRIEF DESCRIPTION OF THE DRAWINGS

FIGS. 9A–9C illustrate one embodiment of the Sign Extension Unit shown in FIG. 6.

DETAILED DESCRIPTION

A method and system for providing a means of performing data transfer operations between a processor and a memory system having more than one byte ordering format is described. In the following description, numerous specific details are set forth, such as data transfer size, bus size, instruction format, and processor operations in order to provide a thorough understanding of the present invention. It will be obvious, however, to one skilled in the art that these specific details need not be employed to practice the present invention. In other instances, well-known processor structures and data and address accessing steps have not been described in detail in order to avoid unnecessarily obscuring the present invention.

Figure 1A:
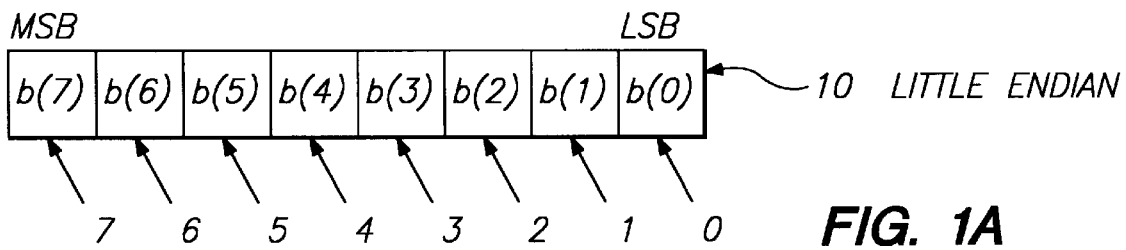
FIGS. 1A and 1B illustrate "Big Endian and "Little Endian" byte ordering schemes.
Figure 1B:
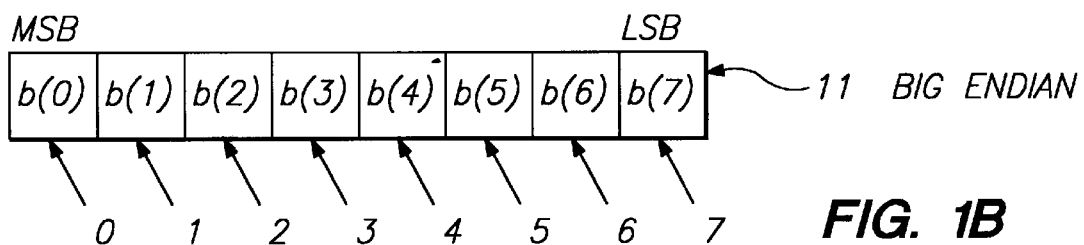

FIGS. 1A and 1B illustrate a word of data having bytes b(0)–b(7) formatted using two different types of byte ordering; "Little Endian" (L.E.) and "Big Endian" (B.E.), respectively. FIG. 1A illustrates bytes b(0)–b(7) stored in register 10 in L.E. byte ordering—where b(0) is the least significant byte (LSB) and b(7) is the most significant byte (MSB). As shown, each byte has an associated offset value ranging from 0–7. The offset of a byte is defined as the number of byte locations that a particular byte is displaced from a defined zero-offset point within a given storage word. The zero off-set point of the L.E. word is the LSB. For instance, as indicated in FIG. 1A, b(0) is stored in the zero offset byte location and is said to have an associated off-set of 0. Further, b(1) has an offset of 1, b(2) has an offset of 2, b(3) has an offset of 3, etc. Put in other words, L.E. byte ordering orders bytes such that, the LSB has an associated off-set of 0 and the MSB has an associated off-set of 7 (in the case of an 8-byte word).

In contrast, bytes b(0)–b(7) stored in register 11 (FIG. 1B) are in B.E. byte order. The zero off-set point of the B.E. word is the MSB. As can be seen, the MSB, b(0), has an offset of 0, b(1) has an offset of 1, b(2) has an offset of 2, b(3) has an offset of 3, b(4) has an off-set of 4, b(5) has an off-set of 5, b(6) has an off-set of 6, and the LSB, b(7), has an off-set of 7. Thus, B.E. byte ordering orders bytes such that, the LSB, b(7), has an associated off-set of 7 and the MSB, b(0), has an associated off-set of 0 (in the case of an 8-byte word).

When designing a computer system having a CPU or other processing device having a certain type of byte ordering it is necessary to ensure that data transfer operations between a processor register and a memory system either, 1) use the same byte ordering conventions or 2) the processor is designed to account for byte ordering differences between the memory system and processor.

The processor of the present invention adapts to different byte ordering conventions by rearranging the order and shifting the bytes within the data being transferred while maintaining a consistent byte order numbering scheme for both B.E. and L.E. Consequently, one aspect of the present invention is that only one instruction is required to perform both a B.E. and L.E. single byte load and store operation since the single byte is always loaded into the same location. In contrast, the prior art method only shifts bytes of data to maintain byte ordering consistency. As a result, a single byte is loaded into different locations depending on the byte order specified in the status register.

Figure 2A:
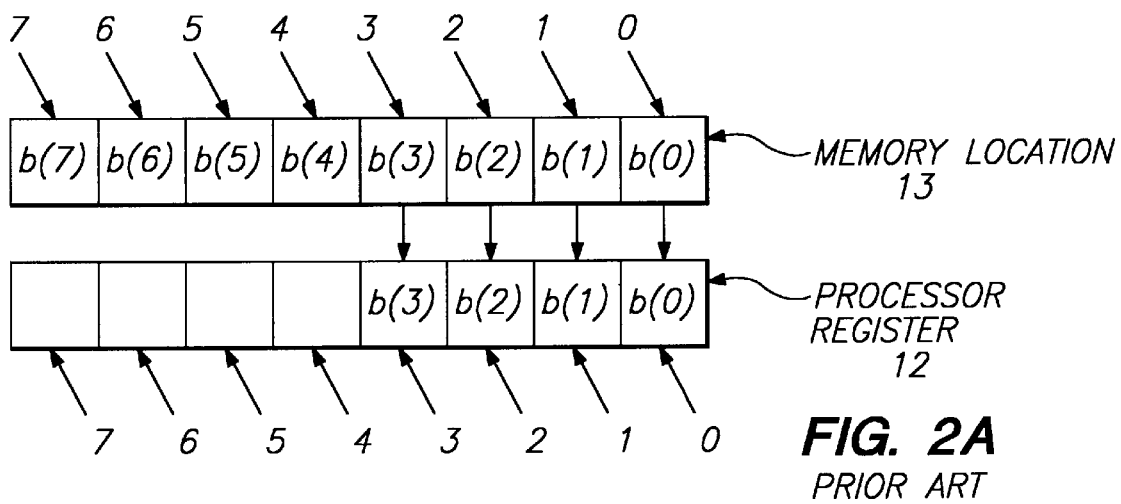
FIGS. 2A and 2B illustrate the prior art method of transferring data between a processor register and a memory block in a memory system using the same and different byte ordering conventions.

FIGS. 2 and 3 illustrate how the method of the present invention differs from the prior art method as described in U.S. patent Ser. No. 4,959,779. In the prior art method, data is always moved such that the relative order of the bytes are always the same. In other words, all of the bytes of data being transferred are shifted a constant shift amount. FIG. 2A shows an eight byte processor register 12 and an eight byte memory block 13 after a 4-byte L.E. load operation is performed having an associate address offset of 0. As shown, processor register 12 loads bytes b(0)–b(3) in little endian order,. i.e. b(0) has an off-set of 0 and b(3) has an offset of 3 from the LSB. Since a L.E. load operation is being performed, the order of the bytes remain the same when transferred such that they retain their original associated offsets.

Figure 2B:
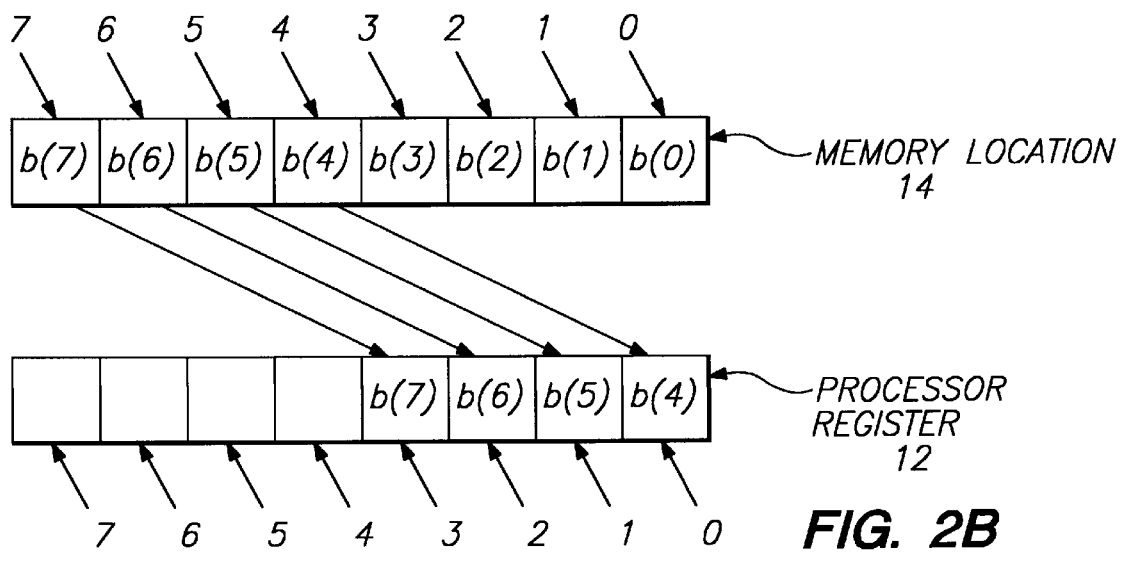

FIG. 2B illustrates the prior art method as taught by U.S. patent Ser. No. 4,959,779 in which a 4-byte B.E. load operation is performed with an address offset of 0 by a processor using L.E. byte ordering. As shown in FIG. 2B, bytes b(4)–b(7) are loaded in processor register 12. When a B.E. load operation is performed, bytes b(4)–b(7) are shifted such that b(7) is loaded into register byte 3, b(6) is loaded into register byte 2, b(5) is loaded into register byte 1, and b(4) is loaded into register byte 0. As can be seen, the prior art method shifts all of the bytes a fixed amount (in this case 4 bytes) such that the relative order of the bytes are always the same.

In comparing the order of the bytes stored in memory block 14 (FIG. 2B) to the order of the bytes loaded in B.E. order shown in FIG. 1B, it can be seen that the order of bytes b(4)–b(7) is not the same. Consequently, although the prior art method shifts the bytes to adapt to B.E. byte ordering, the actual order of the shifted data is inconsistent with what is expected by a processor or memory system using B.E. byte ordering. Due to this byte ordering inconsistency, problems may arise when the relative byte order of the transferred data is necessary for understanding the transferred data when it is subsequently read.

In addition, a system using both L.E. and B.E. memory transfers will exhibit inconsistencies because the offsets are adjusted. For example, a 4-byte word stored with a L.E. store at address zero is not loaded with a B.E. load at address zero. Instead, the B.E. load employs an inconsistent address of four indicating an offset of 0. Due to this byte order inconsistency, problems may arise when storing data using one byte ordering and loading data with another byte ordering.

The present invention, on the other hand, does not shift data a fixed amount as performed by the prior art. Instead, the present invention rearranges or rearranges and shifts the data thereby preserving the expected B.E. byte ordering as shown in FIG. 1B.

Figure 3A:
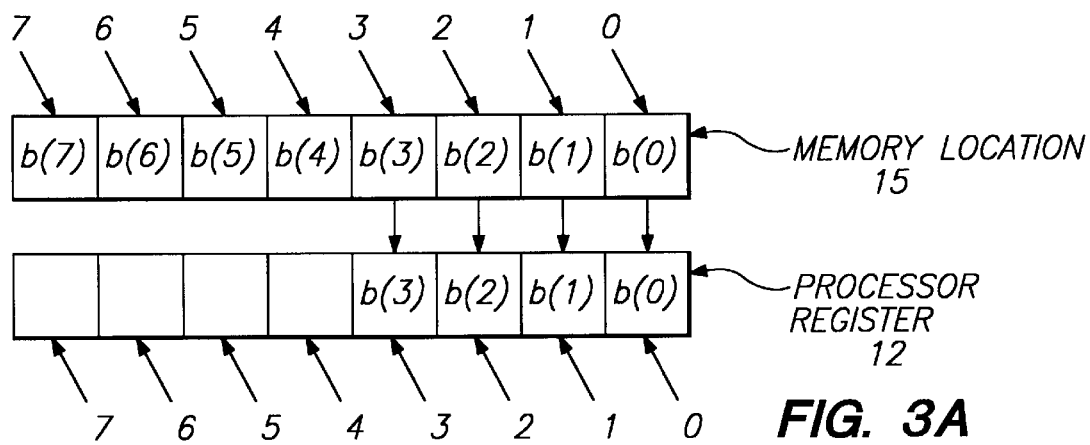
FIGS. 3A and 3B illustrate the manner in which the method of the present invention performs data transfers between a processor register and a memory block having the same and different byte ordering conventions.
Figure 3B:
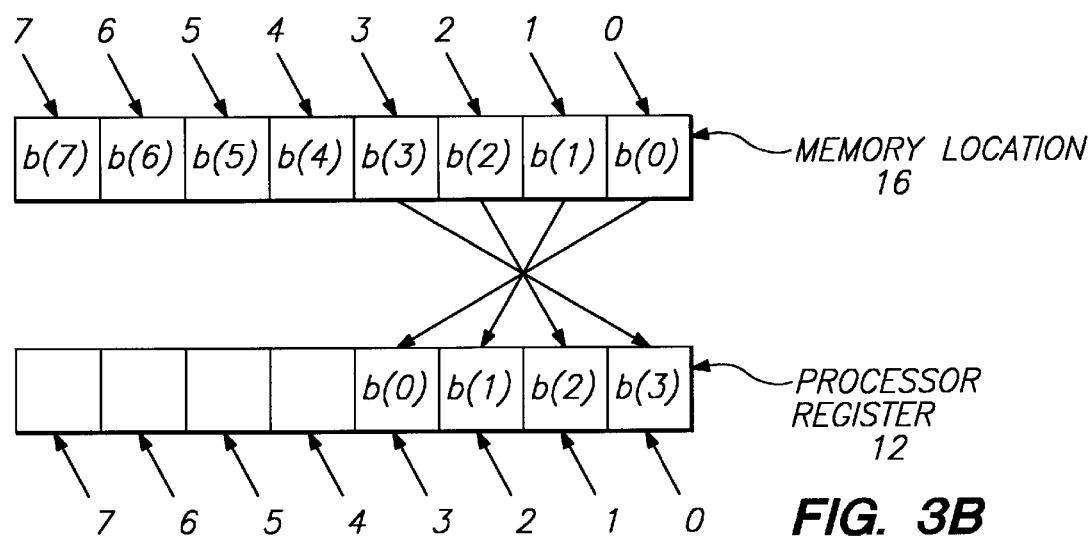

FIGS. 3A and 3B show data transfer operations performed in accordance with the method of the present invention. FIG. 3A shows a 4-byte L.E. load operation performed between a processor register 12 using L.E. byte order and memory block 15. As shown, the order of bytes b(0)–b(3) remains the same, i.e. b(0) has an off-set of 0, b(1) has an off-set of 1, b(2) has an off-set of 2, b(3) has an off-set of 3. FIG. 3B shows a B.E. load data transfer of bytes b(0)–b(3) between processor register 12 and memory block 16. It can be seen that instead of shifting the bytes a fixed amount to put into B.E. format as performed by the prior art, the present invention rearranges the order of the bytes so that byte ordering is consistent with the B.E. byte ordering shown in FIG. 1B. Thus, the present invention places the bytes in the proper byte locations to ensure that the order of the bytes are consistent with what is expected for a B.E. byte ordering. It should also be noted the bytes are not shifted in FIG. 3B since the offset of the address is zero. However, if the address offset is non-zero, shifting is also performed.

Figure 4:
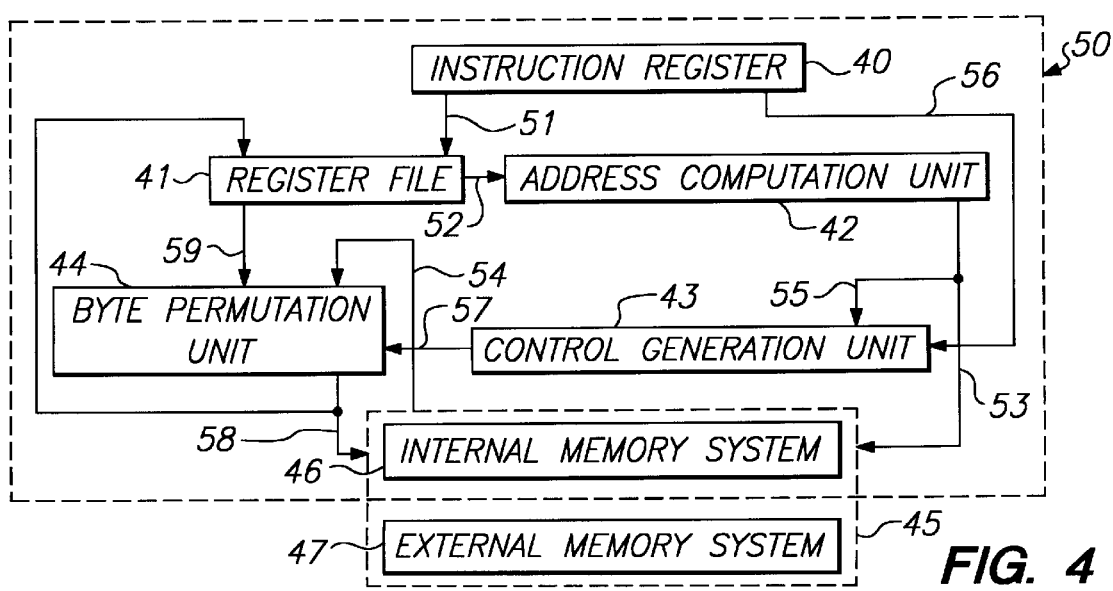
FIG. 4 illustrates an embodiment of the system of the present invention.

FIG. 4 illustrates one embodiment of the processor system 50 of the present invention. Processor 50 shown in FIG. 4 includes instruction register 40, register file 41, address computation unit 42, control generation unit (CGU) 43, byte permutation unit (BPU) 44 and internal memory system 46. Memory system 46 is a portion of a total memory system 45 which also includes external memory system 47. External memory system 47 may be part of another processing unit or other external device. Further, external memory 47 may or may not be interfacing with processors that are using byte ordering formats other than the format being utilized by processor 50 when performing data transfers to internal memory 46. Data transfer operations are initiated when an instruction code, such as that shown in FIGS. 5A and 5B, is loaded into instruction register 40.

Figure 5A:
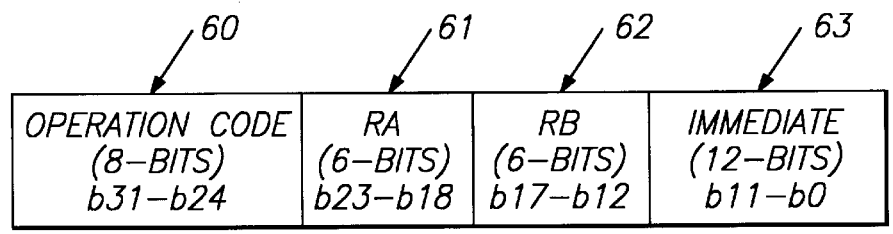
FIGS. 5A and 5B illustrate two format embodiments of the instruction code of the present invention.
Figure 5B:
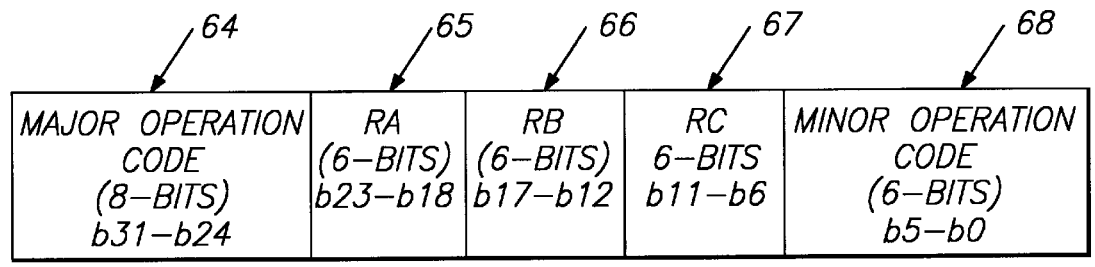

FIGS. 5A and 5B illustrate two embodiments of instruction codes that may be loaded into instruction register 40 of the present invention for performing data transfers according to the present invention. FIG. 5A illustrates an instruction code having four fields 60–63; each field containing different encoded information. Field 60 contains 8 bits of data corresponding to the operation code. In one embodiment, the operation code provides three pieces of information. First it indicates the operation to be performed. For example, either a load or a store operation. The operation code also indicates the byte ordering format of the data transfer being performed such as L.E. or B.E. And finally, the operation code indicates the size of the data that is being transferred. Fields 61, 62, and 63 (i.e. ra, rb, and immediate) contain address information that is utilized for determining where the data is to be loaded or stored.

FIG. 5B illustrates a second embodiment of a data transfer instruction code of the present invention containing 5 fields, 64–68. Fields 64 and 68 indicate the operation to be performed. Two operation code fields are utilized in this instruction code so as to increase the total potential number of instructions of the instruction set. For instance, the major operation code indicates a particular class of operation to be performed while the minor operation code indicates the particular operation within that class of operation. The minor operation code also indicates that size of the data transfer and the byte ordering format. Fields 65, 66, and 67 identify source and destination address locations for the data transfer. It should be understood that, the instruction code of the present invention requires that the byte order information, data size, and operation and address information be incorporated into it. However it should be obvious that the instruction code of the present invention is not limited to the number of bytes and format shown in FIGS. 5A and 5B and that other additional information may be included within the instruction code if desired.

Register file 41 holds multiple registers of data. For instance, register 41 may hold data retrieved from memory in a load operation, data that is to be eventually stored to memory in a store operation, or address data from instruction register 40.

Address computation is performed by address computation unit 42. For the embodiments of the instruction codes of the present invention shown in FIGS. 5A and 5B address computation is performed in two different manners. For instance, in the case of a load operation using the instruction code shown in FIG. 5A, the source address (i.e. the memory address of the data to be loaded) is determined by adding fields ra and the immediate field (i.e. fields 61 and 63, FIG. 5A). Field rb (field 62, FIG. 5A) indicates the processor register that the accessed data is to be loaded into. When a load operation is performed utilizing the instruction code shown in FIG. 5B, fields 65 and 66 (i.e. ra and rb) are added together to determine the source address and field rc (field 67, FIG. 5B) indicates the processor destination register that the data is to be loaded into.

A load operation is performed by loading the address data from instruction register 40 into register file 41 on bus 51. This address data is subsequently coupled to address computation unit 42 on bus 52. An address is calculated and then transmitted to memory system 45 on bus 53. In response, memory system 45 accesses and couples data onto bus 54 to BPU 44.

A portion of the computed address on bus 53 is also coupled to logic control unit 43 on bus 55. In addition, the operation code from instruction register 40 is coupled onto bus 56 to CGU 43. In one embodiment of the present invention, the operation code includes the following information: 1) the size of the data transfer, 2) the byte ordering format to be used for the data transfer operation, 3) the type of operation being performed. In a variation of the above embodiment, the operation may also include information pertaining to whether a sign or zero fill step is to be performed. CGU 43 uses the operation and byte order information supplied on bus 56, in addition to the portion of the computed address from bus 55, to generate a set of control signals on bus 57. The control signals on bus 57 are coupled to BPU 44.

BPU 44, in response to the control signal on bus 57, functions to either: 1) rearrange the bytes in the data being transferred when the byte order format indicated in instruction register 40 is other than the byte order format being utilized by processor 50 and the offset of the address is zero, 2) rearrange and shift the bytes of data being transferred when the offset of the address is non-zero and the byte order format indicated in instruction register 40 is other than the byte order format being utilized by processor 50, 3) pass the data when byte order of operation is the same as that being utilized by processor 50 and the offset of the address is zero, or 4) shift the data when byte order of operation is the same as that being utilized by processor 50 and the offset of the address is non-zero.

Once processed by BPU 44, the data is coupled back to register file 41 on bus 58 where it is loaded into the processor register as indicated by the destination address in the instruction code.

A store operation is performed in a similar manner as a load operation. Address information from the instruction register 40 is coupled to register file 41 and then to address computation unit 42. Unit 42 computes the necessary address information and couples it to CGU 43 along with operation information coupled on bus 56. CGU provides the appropriate control (on bus 57) to BPU 44. In response to control signals on bus 57, BPU 44 either rearranges, rearranges/shifts, shifts or passes data provided by register file 41 on bus 59. This processed data is then coupled to memory system 45 on bus 58 and stored into the memory location as indicated by the instruction.

In one embodiment of the present invention, processor 50 internally performs data transfers using L.E. byte order format. As a result, in the case of a B.E. load or store operation with memory system 45, data is either rearranged or rearranged and shifted. And, in the case of a L.E. load or store operation with memory system 45, data is either passed directly through the BPU or is shifted.

One implementation of the CGU 43 and BPU 44 of the present invention is disclosed in patent application Ser. No. 08/516,398, entitled "Method and System for Implementing Data Manipulation Operations" assigned to the assignee of the present invention. This implementation is capable of performing all aligned load and store operations described in the present invention, as well as additional operations not pertinent to the present invention.

Figure 6:
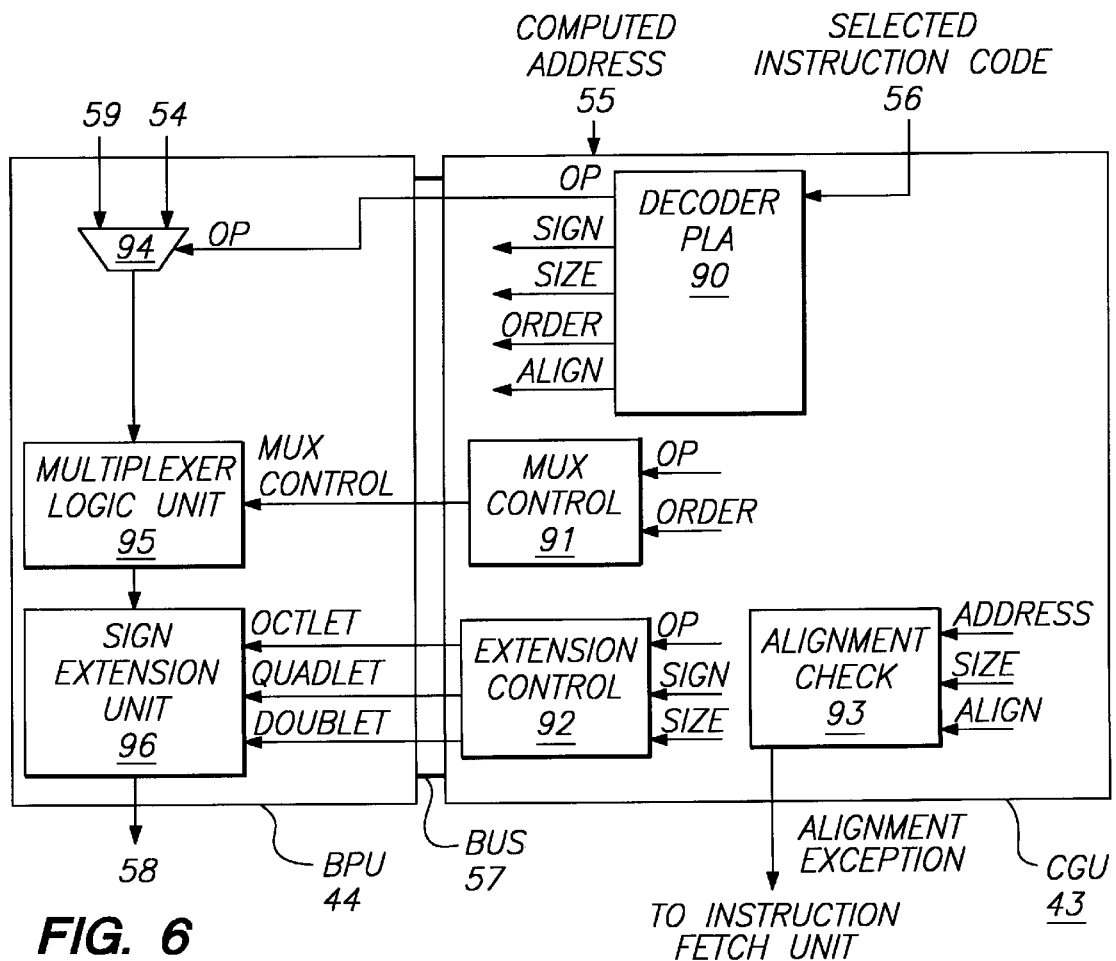
FIG. 6 illustrates the block diagrams of one embodiment of the Control Generation Unit and Byte Permutation Unit shown in FIG. 4.

Another implementation of CGU 43 and BPU 44 which is capable of performing all the operations of the present invention without limitation is shown in FIG. 6. In this implementation, instructions provided on bus 56 to CGU 43 are formatted as shown in FIGS. 5A and 5B. The instructions employed in this implementation are listed in Tables 1–3.

TABLE 1

Major Operation Code Field Values

| MAJOR | Operation |
|---|---|
| 128 | LU16LAI |
| 129 | LU16BAI |
| 130 | LU16LI |
| 131 | LU16BI |
| 132 | LU32LAI |
| 133 | LU32BAI |
| 134 | LU32LI |
| 135 | LU32BI |
| 136 | L16LAI |
| 137 | L16BAI |
| 138 | L16LI |
| 139 | L16BI |
| 140 | L32LAI |
| 141 | L32BAI |
| 142 | L32LI |
| 143 | L32BI |
| 144 | L64LAI |
| 145 | L64BAI |
| 146 | L64LI |
| 147 | L64BI |
| 148 | L128LAI |
| 149 | L128BAI |
| 150 | L128LI |
| 151 | L128BI |
| 152 | L8I |
| 153 | LU8I |
| 154 | |
| 155 | |
| 156 | |
| 157 | |
| 158 | |
| 159 | L.MINOR |
| 160 | SAAS64LAI |
| 161 | SAAS64BAI |
| 162 | SCAS64LAI |
| 163 | SCAS64BAI |
| 164 | SMAS64LAI |
| 165 | SMAS64BAI |
| 166 | SMUX64LAI |
| 167 | SMUX64BAI |
| 168 | S16LAI |
| 169 | S16BAI |
| 170 | S16LI |
| 171 | S16BI |
| 172 | S32LAI |
| 173 | S32BAI |
| 174 | S32LI |
| 175 | S32BI |
| 176 | S64LAI |
| 177 | S64BAI |
| 178 | S64LI |
| 179 | S64BI |
| 180 | S128LAI |
| 181 | S128BAI |
| 182 | S128LI |
| 183 | S128BI |
| 184 | S8I |
| 185 | |
| 186 | |
| 187 | |
| 189 | |
| 190 | |
| 191 | S.MINOR |

TABLE 2

Minor Operation Code Field Values for L.MINOR

| L.MINOR | Operation |
|---|---|
| 0 | LU16LA |
| 1 | LU16BA |
| 2 | LU16L |
| 3 | LU16B |
| 4 | LU32LA |
| 5 | LU32BA |
| 6 | LU32L |
| 7 | LU32B |
| 8 | L16LA |
| 9 | L16BA |
| 10 | L16L |
| 11 | L16B |
| 12 | L32LA |
| 13 | L32BA |
| 14 | L32L |
| 15 | L32B |
| 16 | L64LA |
| 17 | L64BA |
| 18 | L64L |
| 19 | L64B |
| 20 | L128LA |
| 21 | L128BA |
| 22 | L128L |
| 23 | L128B |
| 24 | L8 |
| 25 | LU8 |

TABLE 3

Minor Operation Code Field Values for S.MINOR

| S.MINOR | Operation |
|---|---|
| 0 | SAAS64LA |
| 1 | SAAS64BA |
| 2 | SCAS64LA |
| 3 | SCAS64BA |
| 4 | SMAS64LA |
| 5 | SMAS64BA |
| 6 | SMUX64LA |
| 7 | SMUX64BA |
| 8 | S16LA |
| 9 | S16BA |
| 10 | S16L |
| 11 | S16B |
| 12 | S32LA |
| 13 | S32BA |
| 14 | S32L |
| 15 | S32B |
| 16 | S64LA |
| 17 | S64BA |
| 18 | S64L |
| 19 | S64B |
| 20 | S128LA |
| 21 | S128BA |
| 22 | S128L |
| 23 | S128B |
| 24 | S8 |

The MAJOR operation code field (field 60, FIG. 5A) of the instruction from instruction register 40 on bus 56 (FIG. 4) indicates the instruction code when it has a value of 128–158 or 160–190 as shown in Table 1 above. The MINOR operation code (field 68, FIG. 5B) indicates the instruction code when the MAJOR operation code field (field 64, FIG. 5B) has a value of 159 or 191 as indicated in Table 1 above.

Figure 7:
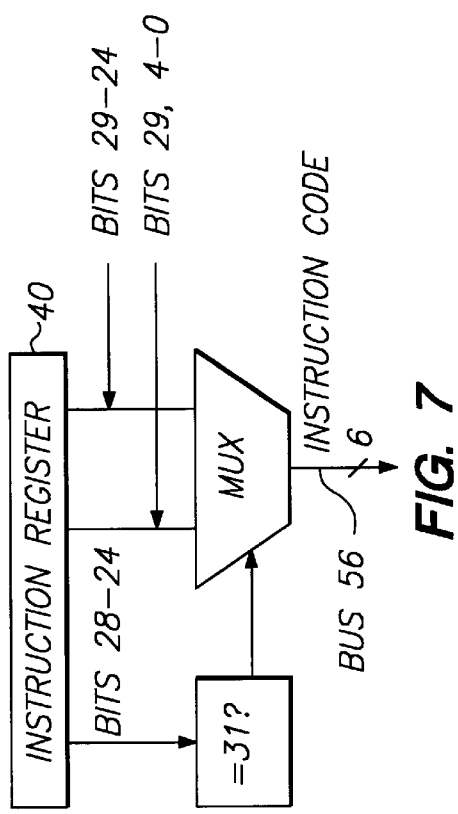
FIG. 7 illustrates the manner in which the instruction code is determined for the embodiment of the present invention using the instruction code formats as shown in FIGS. 5A and 5B.

The same set of operations are available in the two instruction formats—the distinction is in the way the memory address is computed. Specifically, for an instruction in the format shown in FIG. 5A, the memory address is computed by adding a base register to the immediate. In the case in which an instruction is in the format shown in FIG. 5B, the memory address is computed by adding two registers. For the purposes of describing the present embodiment, the two instruction formats can be reduced into a single instruction by selecting bits 29–24 as the instruction code (FIG. 5A formatted instructions) or bits 29 and bits 4–0 as the code (FIG. 5B formatted instructions) when bits 28–24 are equal to 31. This selection technique is shown in FIG. 7. As shown, bits 28–24 from the instruction code register is coupled to a means for determining if bits 28–24 is equal to 31, (i.e. "11111" in binary representation). If bits 28–24 of the instruction code is not equal to 31, then the instruction is in the FIG. 5A format and bits 29–24 are selected by the multiplexer in FIG. 7. In this case, the operation to be performed is defined as indicated in Table 1. On the other hand, if bits 28–24 are equal to 31, then the instruction is in the FIG. 5B format and bits 29,4–0 are selected to indicate the instruction code as defined in Table 2.

The selected 6 bit code (i.e. either bits 29–24 or 29,4–0) is interpreted by Decoder PLA 90 (FIG. 6) as indicated in Table 4 shown below:

TABLE 4

| code | instruction | op | sign | size | order | align |
|---|---|---|---|---|---|---|
| 0 | LU16LA | L | U | 16 | L | A |
| 1 | LU16BA | L | U | 16 | B | A |
| 2 | LU16L | L | U | 16 | L | u |
| 3 | LU16B | L | U | 16 | B | u |
| 4 | LU32LA | L | U | 32 | L | A |
| 5 | LU32BA | L | U | 32 | B | A |
| 6 | LU32L | L | U | 32 | L | u |
| 7 | LU32B | L | U | 32 | B | u |
| 8 | L16LA | L | s | 16 | L | A |
| 9 | L16BA | L | s | 16 | B | A |
| 10 | L16L | L | s | 16 | L | u |
| 11 | L16B | L | s | 16 | B | u |
| 12 | L32LA | L | s | 32 | L | A |
| 13 | L32BA | L | s | 32 | B | A |
| 14 | L32L | L | s | 32 | L | u |
| 15 | L32B | L | s | 32 | B | u |
| 16 | L64LA | L | — | 64 | L | A |
| 17 | L64BA | L | — | 64 | B | A |
| 18 | L64L | L | — | 64 | L | u |
| 19 | L64B | L | — | 64 | B | u |
| 20 | L128LA | L | — | 128 | L | A |
| 21 | L128BA | L | — | 128 | B | A |
| 22 | L128L | L | — | 128 | L | u |
| 23 | L128B | L | — | 128 | B | u |
| 24 | L8 | L | s | 8 | — | — |
| 25 | LU8 | L | U | 8 | — | — |
| 26 | | — | — | — | — | — |
| 27 | | — | — | — | — | — |
| 28 | | — | — | — | — | — |
| 29 | | — | — | — | — | — |
| 30 | | — | — | — | — | — |
| 31 | | — | — | — | — | — |
| 32 | SAAS64LA | SAAS | — | 64 | L | A |
| 33 | SAAS64BA | SAAS | — | 64 | B | A |
| 34 | SCAS64LA | SCAS | — | 64 | L | A |
| 35 | SCAS64BA | SCAS | — | 64 | B | A |
| 36 | SMAS64LA | SMAS | — | 64 | L | A |
| 37 | SMAS64BA | SMAS | — | 64 | B | A |
| 38 | SMUX64LA | SMUX | — | 64 | L | A |
| 39 | SMUX64BA | SMUX | — | 64 | B | A |
| 40 | S16LA | S | — | 16 | L | A |
| 41 | S16BA | S | — | 16 | B | A |
| 42 | S16L | S | — | 16 | L | u |
| 43 | S16B | S | — | 16 | B | u |
| 44 | S32LA | S | — | 32 | L | A |
| 45 | S32BA | S | — | 32 | B | A |
| 46 | S32L | S | — | 32 | L | u |
| 47 | S32B | S | — | 32 | B | u |
| 48 | S64LA | S | — | 64 | L | A |
| 49 | S64BA | S | — | 64 | B | A |
| 50 | S64L | S | — | 64 | L | u |
| 51 | S64B | S | — | 64 | B | u |
| 52 | S128LA | S | — | 128 | L | A |

TABLE 4-continued

| code | instruction | op | sign | size | order | align |
|---|---|---|---|---|---|---|
| 53 | S128BA | S | — | 128 | B | A |
| 54 | S128L | S | — | 128 | L | u |
| 55 | S128B | S | — | 128 | B | u |
| 56 | S8 | S | — | 8 | — | — |
| 57 | | — | — | — | — | — |
| 58 | | — | — | — | — | — |
| 59 | | — | — | — | — | — |
| 60 | | — | — | — | — | — |
| 61 | | — | — | — | — | — |
| 62 | | — | — | — | — | — |
| 63 | | — | — | — | — | — |

(Note: "op" indicates the operation (S—store, L—load); "sign" indicates "signed" (s) or "unsigned" (u) operations; size indicates the size of the operand in bits; order indicates little (L) or big (B) endian order; align indicates aligned (A) or unaligned (U) operations; and "—" indicates don't care output).

It should also be noted that the single byte instructions in Table 4 (e.g. L8, LU8, S8) do not specify order as was previously discussed. In this embodiment, bit 0 of the 6-bit instruction code is used to indicate the byte order of the load or store operation. With the exception of the SAAS, CAS, MAS, and SMUX operations, bit 5 indicates whether the operation is a load or store and bit 1 indicates whether the operation is aligned or unaligned.

PLA Decoder 90 interprets the selected instruction code and generates control for MUX Control 91, Extension Control 92 and Alignment Check 93 (FIG. 6). In response to the "op" and "order" control provided by Decoder 90, MUX Control 91 generates 64-bits of multiplexer control. The 64-bit mux control is used to control a set of 16-to-1 multiplexers in Multiplexer Logic Unit (MLU) 95, (FIG. 6). Similarly, Extension Control 92 generates control signals "octlet", "quadlet", and "doublet" in response to "op", "sign" and "size". Alignment Check 93, in response to computed "address", "size" and "align", generates an alignment exception signal which is coupled to the instruction fetch unit of the system.

The multiplexer control generated by Mux Control 91 is determined as shown in Table 5 for each of the possible operation conditions:

TABLE 5

| operation condition | op | order | mux bits 4*i+3..4*i |
|---|---|---|---|
| little-load | L | L | $address_{3..0} + 1$ |
| big-load | L | B | $address_{3..0} + size_{6..3} - i - 1$ |
| little-swap | SAAS | L | |
| big-swap | SAAS | B | |
| little-swap | SCAS | L | |
| big-swap | SCAS | B | |
| little-swap | SMAS | L | |
| big-swap | SMAS | B | |
| little-store | SMUX | L | $i - address_{3..0}$ |
| big-store | SMUX | B | $size_{6..3} - 1 - i - address_{3..0}$ |
| little-store | S | L | $i - address_{3..0}$ |
| big-store | S | B | $size_{6..3} - 1 - i - address_{3..0}$ |

(Note: $address_{3..0}$ is the lower order four bits of the byte address provided on bus 55, FIG. 4, $size_{6..3}$ is the size of the operand in bytes, and all adds and subtracts in Table 5 are performed module 16; i.e. arithmetic is 4 bits wide with overflows discarded.)

Table 5 gives the mux control bits in general terms. For example, for the little-load operation in Table 5 in which op=L and order=L, mux control bits b3...b0 is $address_{3..0}$; mux control bits b7...b4 is $1+address_{3..0}$; mux control bits b11...b8 is $2+address_{3..0}$, etc.; Thus the general form for determining the mux control bits is: for i:=0 to 15; mux control bits 4*i+3...4*i is (address$_{3...0}$+i). Similarly, for big-load (i.e. op=L and order=B), mux control bits b3...b0 is address$_{3...0}$+size$_{6...3}$−1, mux control bits b7...b4 is address$_{3...0}$+size$_{6...3}$−2; mux control bits b11...b8 is address$_{3...0}$+size$_{6...3}$−3 etc. Consequently, the general form for the mux bits in this operation are: for i:=0 to 15; mux control bits 4*i+3...4*i is (address$_{3...0}$+size$_{6...3}$−i−1). In the case of operations SAAS (i.e. Little-swap) and SCAS (Big-swap) these operations are performed in two-cycles and both involve loads and stores; the mux control for each cycle in these operations is determined the same as a load when loading data and the same as a store when storing data.

The extension logic control is determined as shown in Table 6.

TABLE 6

| op | sign | size | octlet | quadlet | doublet |
|---|---|---|---|---|---|
| L | U | 8 | 0 | 0 | 0 |
| L | s | 8 | bit 7 | bit 7 | bit 7 |
| L | U | 16 | 0 | 0 | bits 15..8 |
| L | s | 16 | bit 15 | bit 15 | bits 15..8 |
| L | U | 32 | 0 | bits 31..16 | bits 15..8 |
| L | s | 32 | bit 31 | bits 31..16 | bits 15..8 |
| L | — | 64 | bits 63..32 | bits 31..16 | bits 15..8 |
| L | — | 128 | bits 63..32 | bits 31..16 | bits 15..8 |
| SAAS | — | — | bits 63..32 | bits 31..16 | bits 15..8 |
| SCAS | — | — | bits 63..32 | bits 31..16 | bits 15..8 |
| SMAS | — | — | bits 63..32 | bits 31..16 | bits 15..8 |
| SMUX | — | — | bits 63..32 | bits 31..16 | bits 15..8 |
| S | — | — | bits 63..32 | bits 31..16 | bits 15..8 |

(Note: an "—" indicates a don't care input).

An alignment check is performed by Alignment Check 93 in response to "address", "size" and "align" control provided by Decoder PLA 90. An alignment exception is generated if (address & (size$_{6...3}$−1))≠0. It should be understood that for unaligned memory operations, the data is contained in one or two adjacent memory words which are indicated by the address. The BPU 44 arranges the bytes for a store operation into the byte positions in which the data will be stored, and for a load operation BPU 44 receives the data from the byte positions from which the data is contained. Memory system 45 performs two successive memory operations when two adjacent memory words are simultaneously accessed by an unaligned load or store. For an unaligned load, memory system 45 combines the portions of the accessed memory words which are actually used as a single word of data when presented to BPU 44.

CGU 43 provides control signals "op", "mux control", "octlet", "quadlet", and "doublet" on bus 57 to BPU 44 to cause it to perform the byte ordering method of the present invention. BPU 44 includes two stages for performing the method of the present invention: Multiplexer Logic Unit 95 (MLU 95) and Sign Extension Unit 96 (SEU 96). The dataword to be processed by BPU 44 originates from either memory system 45 on bus 54 (in the case of a load operation) or from register file 41 on bus 59 (in the case of a store operation). In response to the "op" signal, multiplexer 94 passes data to MLU 95 from either bus 54 or bus 59. MLU 95 in response to the 64-bit mux control provided by mux control 91, rearranges the bits in the dataword as determined by the byte order provided in the mux control signals (as indicated in the instruction on bus 56).

The output of MLU 95 is coupled to Sign Extension Unit (SEU) 96 which functions to sign extend the dataword provided by MLU 95 according to the control signals "octlet", "quadlet", and "doublet" as determined by the "op", "sign", and "size" control signals.

Figure 8:
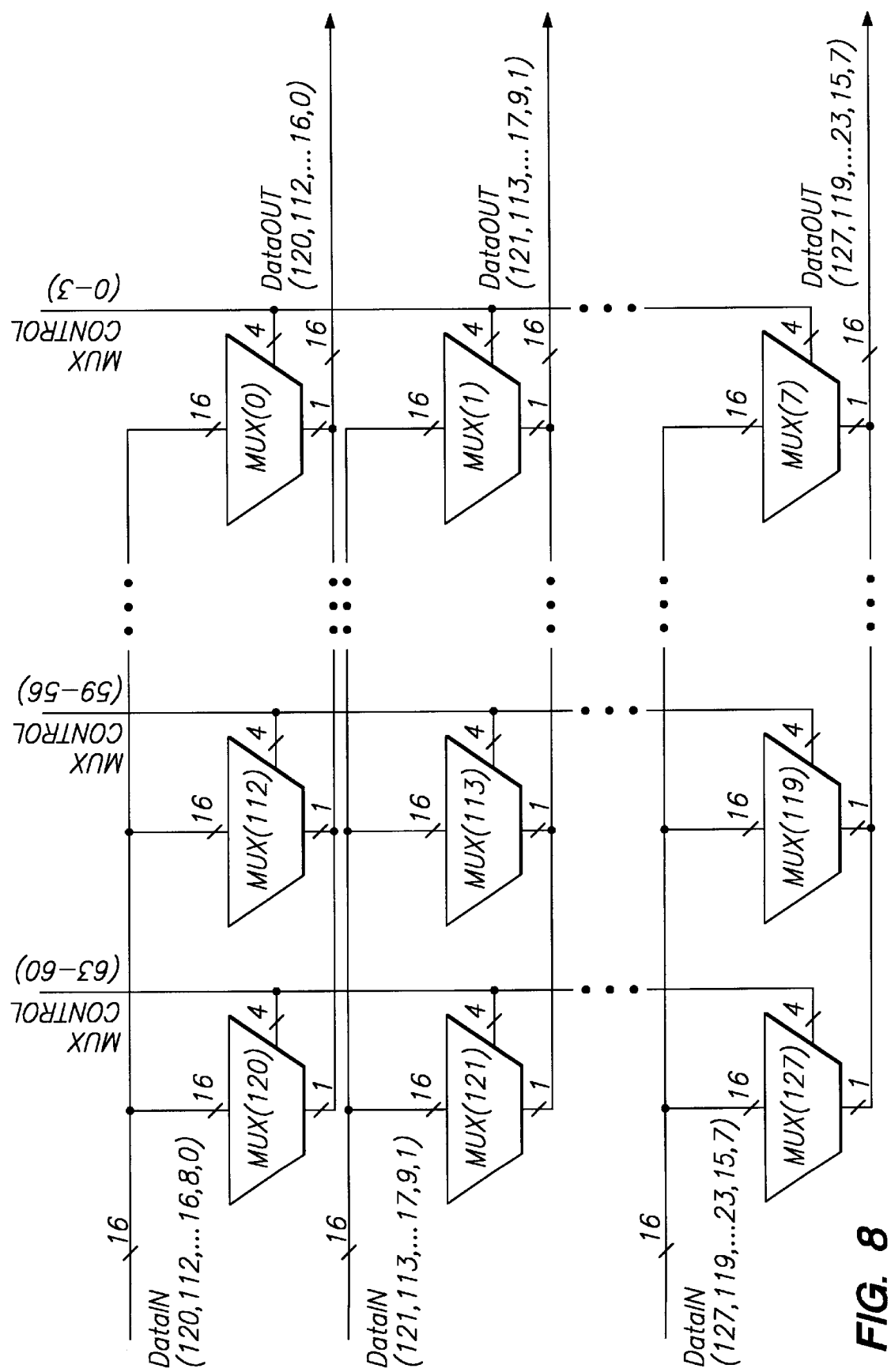
FIG. 8 illustrates one embodiment of the Multiplexer Logic Unit shown in FIG. 6.

FIG. 8 illustrates one implementation of MLU 95 (for processing a dataword having up to 128 bits). It includes 128 16-to-1 multiplexers—each controlled by four bits of the 64-bit mux control signal provided by Mux Control 91. The 128-bit data input bus, DataIN(127...0), and the 64-bit control mux signal, mux control(63...0) are coupled to mux(127...0). Each of mux(127...0) outputs a single bit of data in the particular byte order as indicated by the instruction code onto one of 128-bit output bus DataOUT(127...0). The rearranged dataword is then coupled to SEU 96.

Figure 9A:
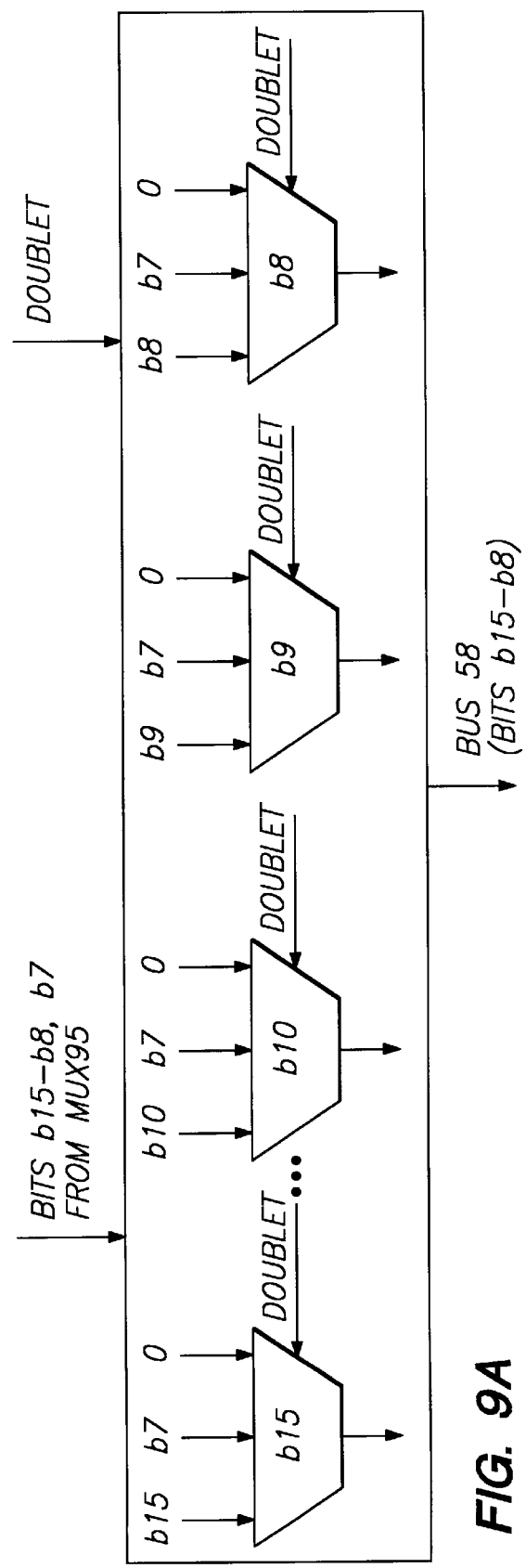

FIGS. 9A–9C illustrate one implementation of SEU 96. In this implementation a 2, 4, or 8 byte sign extension can be performed on bits b63–b0. Since no sign extension is performed on bits b127–b64, they are passed directly to output bus 58, (FIG. 6). Further bits b7–b0 are passed directly to output bus 58. Bits b15–b8, and b7 are coupled to the circuit as shown in FIG. 9A which functions to fill bit locations b15–b8 with either: 1) the b7 value (in the case of a 2-byte sign extend), 2) the actual value of the bit (in the case of no sign extend), or 3) with a "0" (in the case of a zero fill) in response to the doublet control signal. Similarly, FIG. 9B functions to perform the sign extension operation on bits b16–b31 in response to the quadlet control signal by filling these bit locations with either: 1) the b7 value (in the case of a 2 byte sign extend), 2) the b15 value (in the case of a 4 byte sign extend), 3) the actual value of the bit (in the case of no sign extend), or 4) with a "0" (in the case of a zero fill) in response to the quadlet control signal. Finally, FIG. 9C illustrates a circuit that performs the sign extend operation on bits b63–b32 by filling these locations with either: 1) the b7 value (in the case of a 2 byte sign extend), 2) the b15 value (in the case of a 4 byte sign extend), 3) the b31 value (in the case of an 8 byte sign extend), 4) the actual value of the bit (in the case of no sign extend), or 5) with a "0" (in the case of a zero fill) in response to the octlet control signal.

Figure 10A:
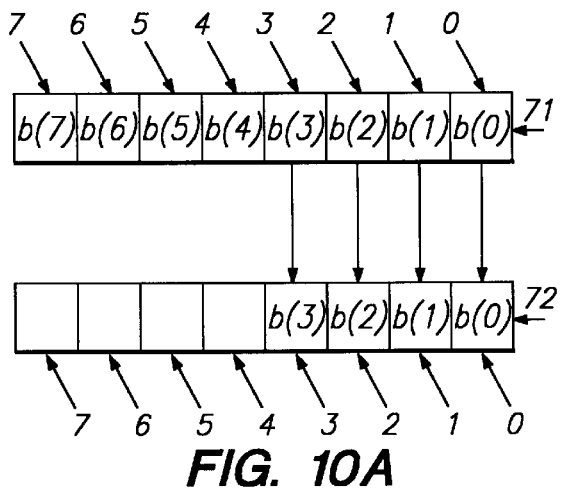
FIGS. 10A–10G illustrate Big and Little Endian load operations performed by a processor using L.E. byte ordering in accordance with one embodiment of the method and apparatus of the present invention.
Figure 10B:
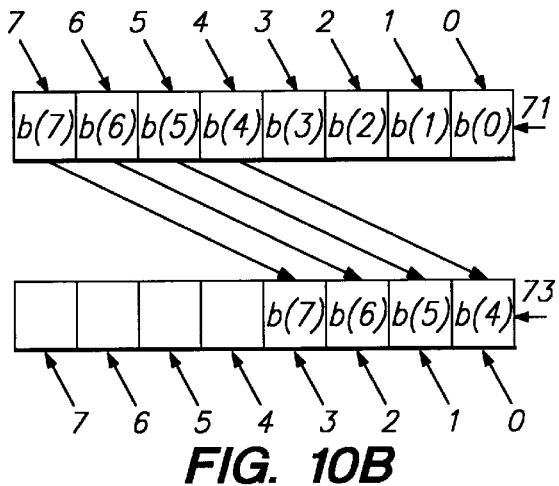

FIGS. 10A–10E illustrate B.E. and L.E. load operations in accordance to the method and system of the present invention. For purposes of explanation, the operations are shown assuming processor 50 uses L.E. byte ordering to perform internal operations. Consequently, processor 50 does not rearrange bytes for a L.E. transfer operation but does rearrange bytes for a B.E. transfer operation. It is also assumed that an 8-byte data path is employed. However, it should be understood that these assumptions are not meant to limit the scope of the present invention FIG. 10A illustrates a 4-byte i.e. (64 bit) L.E. load operation of the lower order bytes from memory area 71 to processor register 72. As shown, the data is neither shifted or rearranged. Thus, in the case of this operation, data is passed directly through BPU 44. FIG. 10B illustrates a 4-byte L.E. load operation of the higher order bytes from memory area 71 to processor register 73. As shown, the data is shifted to the lower order locations in processor register 73. Thus, in the case of this operation, the data is shifted by BPU 44.

Figure 10C:
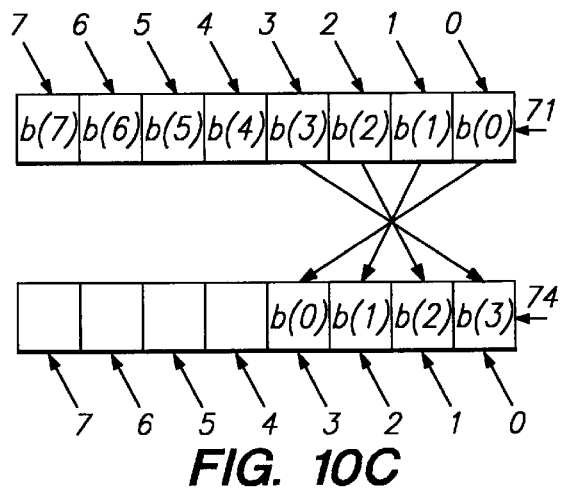
Figure 10D:
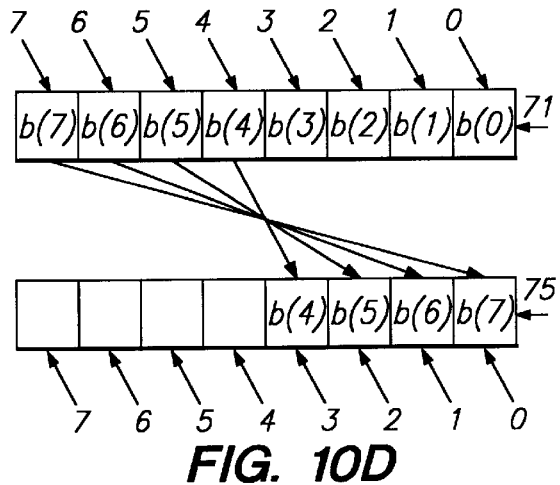

FIG. 10C illustrates a 4-byte B.E. load operation of the lower order bytes from processor memory area 71 to processor register 74. As shown, the data is rearranged into B.E. order. Thus, in this case the data is rearranged by BPU 44. FIG. 10D illustrates a 4-byte B.E. load operation of the higher order bytes from memory area 71 to processor register 75. As shown, the data is shifted and rearrange by BPU 44.

Figure 10E:
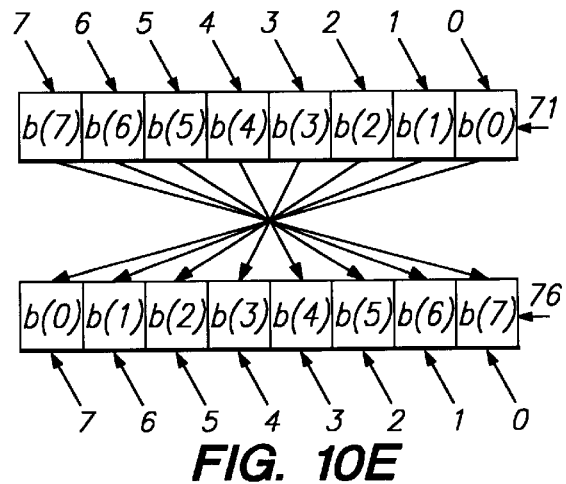
Figure 10F:
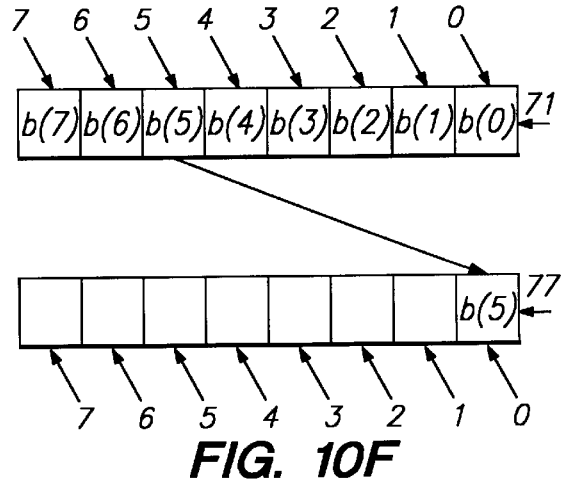

FIG. 10E illustrates an 8-byte B.E. load operation from memory area 71 to register 76 in which all bytes are rearranged by BPU 44. FIG. 10F illustrates a single byte B.E. and L.E. load operation between a memory area 71 and processor register 77. As described above, this operation is the same for both B.E. and L.E. operations since a single byte is consistently loaded into the same byte location for both a B.E. single byte load and a L.E. single byte load. Consequently, a single instruction can be used to perform both of these operations.

Figure 10G:
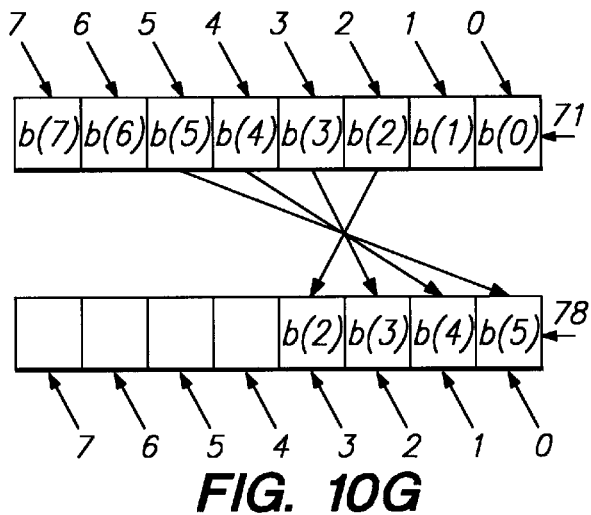

The present invention also applies to unaligned data transfers in which the memory address in the transfer instruction corresponds to a number which is not a multiple of the size of the memory transfer. FIG. 10G illustrates an example of a 4-byte unaligned B.E. load operation according to the method of the present invention from memory area 71 to processor register 78 where the address indicated in the instruction corresponds to byte location b(2). It should be noted that some unaligned transfers cross memory word boundaries and therefore reference two adjacent memory words.

Figure 11A:
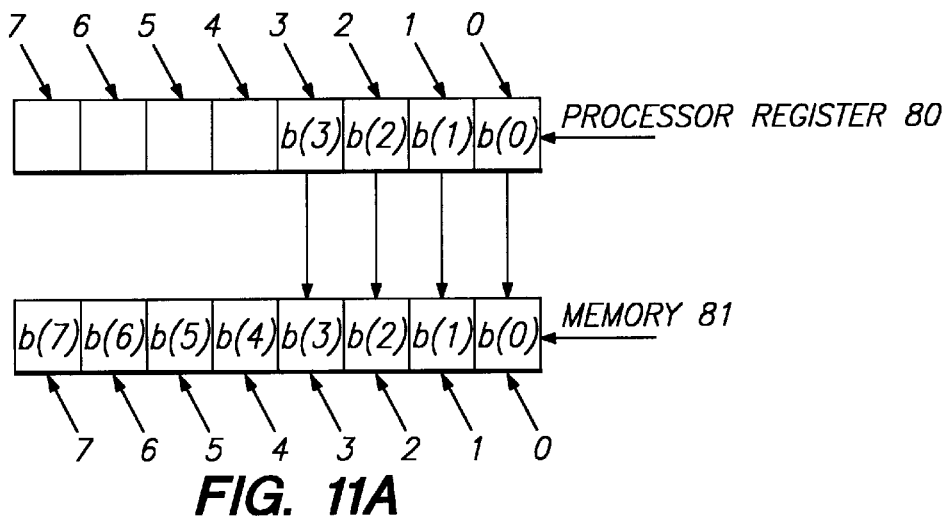
FIG. 11A illustrates a 4-byte L.E. store operation in accordance to the method and apparatus of the present invention having an address with an offset of zero.
Figure 11B:
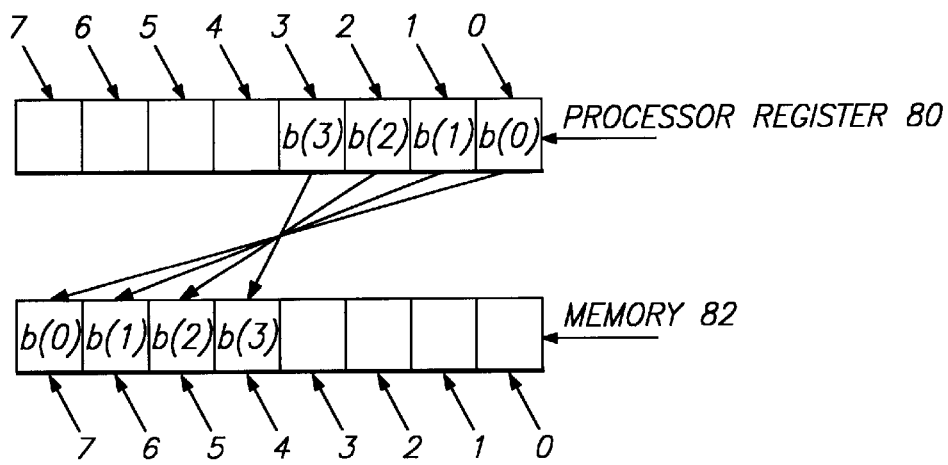
FIG. 11B illustrates a 4-byte B.E. store operation in accordance to the method and apparatus of the present invention having and address with an offset of 4.

Also illustrated (in FIGS. 11A and 11B) are examples of two store operations performed in accordance to the method and system of the present invention. FIG. 11A illustrates a 4-byte L.E. store operation having an address with an offset of zero. In this operation, bytes b(0)–b(3) in processor register 80 are transferred to memory location 81 in the same order with an offset of zero. FIG. 11B illustrates a 4-byte B.E. store operation having an address with an offset of 4 in which bytes b(0)–b(3) are both rearranged and shifted (by 4 bytes) during the transfer of data between processor register 80 and memory location 82.

It should be noted that in some cases it is advantageous to standardize the byte ordering of data that is interpreted directly by the processor and is larger than a single byte (such as processor instructions that may be employed interchangeably within both L.E. software and B.E. software applications). Standardizing this type of data eliminates the potential of misinterpreting instructions. Thus, in one embodiment of the present invention, L.E. byte ordering is exclusively used for these types of instructions. For instance, an instruction referred to as a gateway instruction provides an address to a "gateway". The gateway is a register that stores pointer addresses in a given byte order. If the order of these bytes are rearranged, the information may be misinterpreted. Thus, in this case a gateway uses only L.E. byte ordering.

It should also be noted that a principal reason that the present invention is able to interface with more than one external device having more than one byte ordering scheme is that the byte ordering information is included within each of the individual processor instructions and the present invention rearranges the order of (and in some cases shifts) bytes according to the byte order information in the instruction. Thus, the processor can rearrange the order of the bytes for each data transfer operation when necessary. This is in contrast to the prior art method in which the processor can only shift all data bytes by a simple shift amount in accordance to a status register thereby limiting its ability to interface with more than one byte ordering scheme.

It should also be noted that because of the manner in which the present invention is implemented a single processor instruction suffices for single-byte loads and stores of either byte order. In other words, single byte load and store instructions of present invention do not specify whether L.E. or B.E. ordering is to be used because other multiple byte load and store operations are consistent with locations used by single byte load and store operations.

Although the elements of the present invention has been described in a conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

I claim:

1. A method of transferring data between a first storage area within a system and a second storage area, wherein said data comprises a given number of bytes, said bytes having an associated order, said system being controlled by encoded instructions and said instructions indicating a data transfer operation defining an associated address offset within said second storage area, said method comprising the steps of:

incorporating byte order information in said instructions, said byte order information indicating a byte ordering format;

rearranging said order of said bytes during said data transfer operation if said byte order information indicates a first byte order format;

leaving said order of said bytes the same during said data transfer operation if said byte order information indicates a second byte ordering format.

2. The method as described in claim 1 wherein said first and second byte ordering formats are one of the "Little Endian" and "Big Endian" byte ordering formats.

3. The method as described in claim 2 further including the step of shifting said data during said data transfer when said offset is non-zero.

4. The method as described in claim 3 wherein said first storage area is a processor register and said second storage area is a memory location.

5. An encoded instruction executed by a data processing system comprising:

a first portion defining a transfer operation of a given number of bytes of data between a first storage area in said system and a second storage area;

a second portion providing address information utilized in said data transfer operation;

a third portion indicating a byte ordering format of said data.

6. The instruction as described in claim 5 wherein said byte ordering format is one of the "Little Endian" and "Big Endian" byte ordering formats.

7. The instruction as described in claim 6 further comprising information indicating said number of bytes.

8. The instruction as described in claim 7 wherein said first storage area is a processor register and said second storage area is a memory location.

9. A method for performing data transfer operations between a first storage area in a system and a second storage area, wherein said data comprises a given number of bytes, said bytes of data having an associated order, said system being controlled by encoded instructions, said method comprising the steps of:

performing multiple byte data transfer operations in which said data has multiple bytes, each of said multiple byte operations having an associated set of multiple byte instructions, each instruction in each set of said multiple byte instructions specifying a distinct byte order, where said order of said multiple bytes depends upon said specified byte order of said each multiple byte instruction;

performing single byte data transfer operations in which said data has a single byte, each of said single byte operations having an associated set of single byte instructions, each instruction in each set of said single byte instructions having an associated distinct byte order, where said single byte is stored into said second storage area independent of said associated distinct byte order of said each single byte instruction.

10. The method as described in claim 9 wherein said each set of single byte instructions and said each set of said multiple byte instructions includes a first instruction specifying a first byte ordering and a second instruction specifying a second byte ordering.

11. The method as described in claim 9 wherein said each set of single byte instructions includes one instruction that does not specify said byte order and wherein said each set of multiple byte instructions includes a first instruction specifying a first byte ordering and a second instruction specifying a second byte ordering.

12. The method as described in claim 10 or 11 wherein said first and second byte order are one of the "Little Endian" and "Big Endian" byte order.

13. The method as described in claim 12 wherein said first storage area is a processor register and said second storage area is a memory location.

14. In a system for performing data transfer operations between a first storage area in a system and a second storage area, wherein said data comprises a given number of bytes, said bytes of data having an associated order, said system being controlled by encoded instructions, a set of encoded instructions for a given data transfer operation comprising:

a set of multiple byte data transfer instructions corresponding to said given data transfer operation when said data has multiple bytes, each instruction in said set of multiple byte instructions specifying a distinct byte order, where said order of said multiple bytes depends upon said specified byte order of said each multiple byte instruction;

a set of single byte instructions corresponding to said given data transfer operation when said data has a single byte, each instruction in said set of single byte instructions having an associated distinct byte order, where said single byte is stored into said second storage area independent of said associated distinct byte order of said each single byte instruction.

15. The set of instructions as described in claim 14 wherein said each set of single byte instructions and said each set of multiple byte instructions includes a first instruction specifying a first byte ordering and a second instruction specifying a second byte ordering.

16. The set of instructions as described in claim 14 wherein said each set of single byte instructions includes one instruction that does not specify said byte order and wherein said each set of multiple byte instructions includes a first instruction specifying a first byte ordering and a second instruction specifying a second byte ordering.

17. The set of instructions as described in claim 15 or 16 wherein said first and second byte order are one of the "Little Endian" and "Big Endian" byte order.

18. The set of instructions as described in claim 17 wherein said first storage area is a processor register and said second storage area is a memory location.

19. In a system for performing data transfer operations between a first storage area in a system and a second storage area, wherein said data comprises a given number of bytes, said bytes of data having an associated order, said system being controlled by encoded instructions, said instructions indicating one of a single and multiple byte data transfer operation and an associated address offset within said second storage area, said system comprising:

a means for computing an address utilized in said data transfer operations, said computing means being responsive to a first portion of said instructions;

a means for generating a control signal responsive to a portion of said address and to a second portion of one of said instructions, wherein said second portion includes byte order information indicating a byte ordering format when said multiple byte transfer operations are performed;

a means for rearranging said order of said multiple bytes during said data transfer operations in response to said control signal when said byte order information indicates a first byte ordering format and said means leaving said order of said multiple bytes the same during said data transfer operations when said byte order information indicates a second byte ordering format.

20. The system as described in claim 19 wherein said second portion includes byte order information indicating a byte ordering format when said single byte transfer operations are performed and said single byte is stored into said second storage area independent of said byte order information.

21. The system as described in claim 19 wherein said second portion does not include byte order information indicating a byte ordering format when said single byte transfer operations are performed and said single byte is stored into said second storage area independent of said byte order information.

22. The system as described in claim 20 or 21 wherein said instructions include information indicating said number of said bytes.

23. The system as described in claim 22 wherein said first and second byte ordering formats are one of the "Little Endian" and "Big Endian" byte ordering formats.

24. The system as described in claim 23 wherein said first storage area is a processor register and said second storage area is a memory location.

* * * * *